United States Patent
Labovitz (10) Patent No.: US 7,529,192 B2
(45) Date of Patent: May 5, 2009

(54) SYSTEM AND METHOD FOR CORRELATING TRAFFIC AND ROUTING INFORMATION

(75) Inventor: Craig H. Labovitz, Ann Arbor, MI (US)

(73) Assignee: Arbor Networks, Chelmsford, MA (US)

( * ) Notice: Subject to any disclaimer, the term of this patent is extended or adjusted under 35 U.S.C. 154(b) by 766 days.

(21) Appl. No.: 10/624,124

(22) Filed: Jul. 21, 2003

(65) Prior Publication Data

US 2005/0018602 A1 Jan. 27, 2005

(51) Int. Cl.
*H04J 1/16* (2006.01)
*G06F 13/00* (2006.01)
(52) U.S. Cl. .................... 370/236; 370/400; 709/224
(58) Field of Classification Search ............... None
See application file for complete search history.

(56) References Cited

U.S. PATENT DOCUMENTS

| | | | |
|---|---|---|---|
| 5,787,253 A | 7/1998 | McCreery | |
| 6,137,782 A | 10/2000 | Sharon et al. | |
| 6,321,270 B1* | 11/2001 | Crawley | 709/238 |
| 6,996,617 B1* | 2/2006 | Aiken et al. | 709/227 |
| 7,016,238 B2* | 3/2006 | Shimizu et al. | 365/189.05 |
| 7,031,311 B2* | 4/2006 | MeLampy et al. | 370/392 |
| 2003/0088529 A1* | 5/2003 | Klinker et al. | 706/3 |
| 2003/0202471 A1* | 10/2003 | Murooka et al. | 370/232 |
| 2003/0204619 A1* | 10/2003 | Bays | 709/238 |
| 2004/0221296 A1* | 11/2004 | Ogielski et al. | 719/313 |
| 2005/0201302 A1* | 9/2005 | Gaddis et al. | 370/254 |
| 2006/0182034 A1* | 8/2006 | Klinker et al. | 370/238 |
| 2007/0016666 A1* | 1/2007 | Duffield et al. | 709/223 |

FOREIGN PATENT DOCUMENTS

| | | |
|---|---|---|
| EP | 0 041 775 A | 10/2004 |
| WO | WO 99 22492 A | 5/1999 |

OTHER PUBLICATIONS

Adashi, O., et al., "Multiagent-based Cooperative Inter-AS Diagnosis in ENCORE" IEEE Publication, Apr. 10, 2000, pp. 521-534, XP010376706.

* cited by examiner

*Primary Examiner*—Andrew Lee
(74) *Attorney, Agent, or Firm*—Lowrie, Lando & Anastasi, LLP

(57) ABSTRACT

In one aspect, it is realized that changes in routing configuration (and therefore network topology) may have an effect on how data is forwarded in a communication network. More particularly, it is realized the changes in the control plane have a statistical effect on information tracked in the data plane, and this relation may be used by a network manager in monitoring the network and determining a control plane cause of a data plane forwarding effect. For instance, a change in BGP routing information (control plane information) may affect the data forwarded by a router based on the changed BGP routing information (e.g., next hop data may be forwarded to a different BGP router attached to another physical port). A system and method are provided that correlate control plane and data plane information to support root cause analysis functions.

29 Claims, 5 Drawing Sheets

SYSTEM AND METHOD FOR CORRELATING TRAFFIC AND ROUTING INFORMATION

FIELD OF THE INVENTION

The invention relates generally to networking, and more specifically to network management.

BACKGROUND OF THE RELATED ART

Communication networks are commonly used to communicate information between systems. Networks generally include intelligent systems that determine how data is forwarded throughout the network. These systems, generally referred to herein as network forwarding nodes, communicate amongst each other to determine the proper path to a particular destination. Example network forwarding nodes include routers (e.g., router devices commercially available from the Cisco Corporation or Juniper Networks) that communicate control information using one or more communication protocols, such as TCP/IP. Such control information may include, for example, routing or forwarding information that determines where data is forwarded. Routing information may include information learned from other nodes, or it may be programmed into the node itself (e.g., network information relating to networks the node is participating in, or static forwarding information (e.g., a static route) programmed into the node). This control information is generally stored in a memory of the network forwarding node during operation, and is used to make forwarding decisions regarding received data. Changes in this control information may be forwarded to other nodes such that topology changes are communicated to other nodes.

BGP routers, for example, exchange routing control information that determines where TCP/IP data is forwarded. More specifically, BGP routers communicate a network's presence to other BGP routers in the network (e.g., the Internet). These communications are generally in the form of packets that associate a network with a network forwarding system by which the network can be reached. Other BGP routers take note of these advertisements, and forward data to other BGP routers based on their knowledge of the network topology. Information may also be programmed into a BGP router to control where data is forwarded.

Other methods (e.g., other routing protocols) may also be used to communicate control information. For instance, control information may be communicated in one or more other protocols (e.g., routing protocols such as OSPF, IGRP, RIP, etc.) among systems for the purpose of determining a network topology. Network forwarding systems such as routers may be capable of conversing and storing a number of different routing protocols.

As discussed, control information determines how data is forwarded in the network, as network forwarding systems forward data to other nodes corresponding to the control information. Network management systems are used to monitor network forwarding nodes using network management software. Network management is used for monitoring performance of the network, performing accounting, provisioning of resources (configuration management), and other functions. Network administrators use network management systems for performing control changes on network forwarding nodes, monitoring these nodes, and for troubleshooting these nodes. Monitoring of network forwarding nodes is a time and labor intensive process, as it involves reviewing and interpreting data forwarding statistics (e.g., how much data were transferred by a node in a period of time, processor and other resource utilizations of the node, etc.). Troubleshooting problems involving these network nodes is also difficult, as it requires experienced personnel to determine the root cause(s) of a particular problem involving multiple possible points of failure.

SUMMARY OF THE INVENTION

In one aspect of the present invention, a method is provided for correlating network information. The method comprises obtaining control information from at least one of a plurality of network resources, obtaining data transmission information from the at least one of the plurality of network resources, and determining that the control information and the data transmission information are related. According to one embodiment of the invention, the act of determining includes determining that a change in control information is related to an observation of a change in data forwarding. According to another embodiment of the invention, the method further comprises an act of observing the change in data forwarding by observing a change, over time, in the data transmission information.

According to another embodiment, the act of determining includes an act of correlating the control information and the data transmission information. According to another embodiment, the method comprises an act of storing, in a database, status information related to a change of the control information. In another embodiment, the control information has a causal effect on the data transmission information.

According to another embodiment of the present invention, the data transmission information includes at least one of the group comprising network characteristics, transport characteristics, application characteristics, reachability information, and unavailability information. According to another embodiment, the control information includes at least one record having a timestamp indicating when the change occurred. According to another embodiment, the at least one record includes information indicating the nature of the change. According to another embodiment, the method further comprises an act of indicating that the change is causally related to a change in data transmission information. According to another embodiment, the method further comprises an act of indicating that the change is causally related to the change in data transmission information.

According to another embodiment, the method further comprises an act of indicating, to a user, that the change is related. In another embodiment, the act of indicating further comprises an act of indicating, to a user, that the change is related. According to another embodiment, the method further comprises acts of monitoring a data transmission of at least one source address, and determining at least one network route associated with the at least one source address, wherein the act of determining that the control information and data transmission information are related further comprises correlating data transmission relating to the monitored data transmission with the at least one network route. According to another embodiment, the resource in a network communication device is configured to forward data to one or more entities of a communication network. According to another embodiment, the control information includes routing information of a network forwarding node. According to another embodiment, the change in data forwarding is produced by a change in control information of a network forwarding node. According to another embodiment, the change in control information includes a change of forwarding control information stored in a memory of the network forwarding node.

According to another embodiment, the method further comprises an act of modeling behavior of a network forwarding system that forwards data based on the control information. According to another embodiment, the method further comprises an act of determining that the obtained data transmission information is inconsistent with the modeled behavior of the network forwarding system. According to another embodiment, the method further comprises an act of correlating the change in the control information with a change in the obtained data transmission information. According to another embodiment, the act of obtaining control information includes an act of passively monitoring at least one transmission of the control information. In another embodiment, the control information is transmitted over a network.

According to another embodiment, the act of obtaining data transmission information includes an act of monitoring data stored in a network forwarding system. According to another embodiment, the method further comprises an act of modeling a link state of the network forwarding system. According another embodiment, the method further comprises an act of correlating the link state with a change in data transmission information. According to another embodiment of the present invention, the act of obtaining control information includes an act of requesting the control information from a network forwarding node.

According to one aspect of the present invention, a system is provided comprising a collector adapted to receive data transmission information, a collector adapted to receive control information, a correlator that correlates the received data transmission information and the received control information. According to one embodiment, the correlator is adapted to store control information periodically over a period of time. According to another embodiment, the correlator is adapted to store a change in control information. According to one embodiment, the data transmission information includes at least one of the group comprising network characteristics, transport characteristics, application characteristics, reachability information, and unavailability information. According to one embodiment, the collector adapted to receive the transmission information and the collector adapted to receive the control information are distributed in a communications network.

According to one embodiment, the system comprises a database adapted to store the received data transmission information and the received control information. According to another embodiment, the collector adapted to receive the data transmission information is configured to receive the data transmission information from one or more network forwarding nodes.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

According to one aspect of the invention, it is realized that changes in routing configuration (and therefore, network topology) may have an affect on how data is forwarded in the network. More particularly, it is realized that changes in the control plane have a statistical affect on information tracked in the data plane, and this relation may be used by a network manager in monitoring the network and determining the control plane cause of a data plane forwarding effect. For instance, a change in BGP routing information (control plane information) may affect the data forwarded by the router based on the changed BGP routing information (e.g., next hop data may be forwarded to a different BGP router attached to another physical port).

While previous systems largely ignore the control plane and concentrate on monitoring the data plane for proper operation, according to one embodiment of the invention, a method and system is provided that monitors and correlates control plane and data plane information and provides historical information which can be used for post-mortem analysis after a communication problem occurs. In particular, a system according to one embodiment of the present invention collects and correlates traffic statistics (data plane information) and routing information (control plane information) of a computer network.

According to one aspect of the present invention, a system is provided that checks control plane and data plane information for consistency. In one embodiment, the system is capable of alerting one or more network administrators when certain types of inconsistencies are detected. For example, the system may note a drop-off in the amount of network traffic to a particular host and a number of withdrawn routes both occurring at the same time. Such a correlation is detected and reported to one or more administrators.

According to one embodiment, a monitoring system is provided that allows an administrator to determine if a change in traffic was caused by a change in the network reachability information seen at the control plane or if a change at the control plane resulted in a change in network traffic. This capability may allow the administrator, for example, to quickly formulate an appropriate response to a network problem which otherwise might go unnoticed or take much longer to address.

In conventional monitoring systems, network administrators often note a change in traffic but must manually run diagnostics on the constituent network forwarding nodes (e.g., routers, switches, etc.) in order to diagnose why the change occurred. Also, the network administrator may not be able to determine that a change in traffic is due to a problem or simply due to a change in use of the network.

According to another embodiment of the present invention, such a system may provide historical information which enables forensic analysis of problems noted in the past but not investigated while they were occurring. That is, most problems that occur in the network are attributed to some change in control. However, because faults are troubleshot after they occur, control data leading up to the problem is generally not saved. According to one embodiment, a system is provided that is capable of recording historical control information to allow a network administrator to more accurately determine the cause of a network event. Because the root cause of a network event may be determined more quickly, network downtime and the resources to determine such a root cause (usually human resources) may be reduced.

Figure 1:
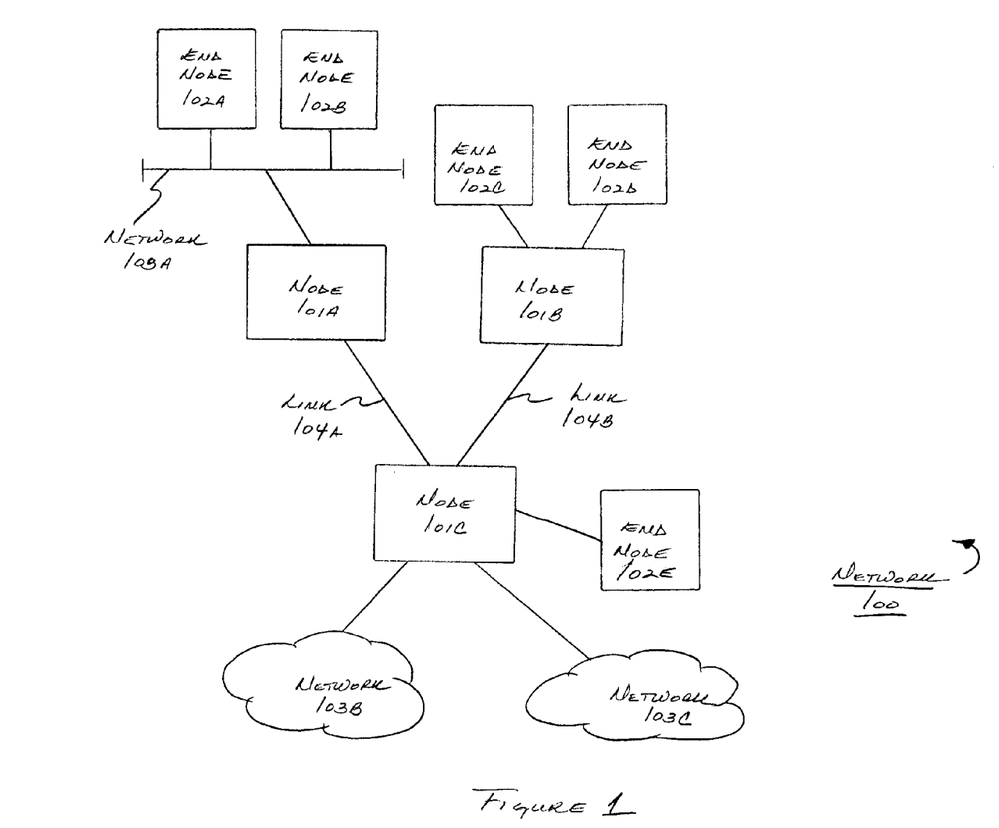
FIG. 1 is a block diagram of a network in which various aspects of the present invention may be practiced.

FIG. 1 shows an exemplary network environment in which various aspects of the present invention may be practiced. In particular, FIG. 1 shows a network 100 which includes one or more networks 103A-103C and end nodes 102A-102E coupled by one or more network forwarding nodes 101A-101C. Although network 100 shows a particular network configuration, it should be appreciated that various aspects of the present invention may be implemented on any network having any number of networks, end nodes, or network forwarding nodes. Network forwarding nodes 101A-101C are coupled by one or more links 104A-104B. Nodes 101A-101C may be, for example, network communication devices such as, for example routers, switches, or any other device or system that may be capable of forwarding data. One example of a network forwarding node is a router system available from the Cisco Corporation. Although various aspects of the invention may be implemented with routers, it should be appreciated that the invention is not limited to being practiced with routing devices, and that any communication node may be used.

Nodes 101A-101C forward data between end nodes and networks based on control information which is programmed in or learned by nodes 101A-101C. In the case of when nodes 110A-101C are routing systems, the control information may be routing information that is stored in memory of the respective nodes. Also, control information may be communicated between network forwarding nodes 101A-101C in the form of messages communicated in a network routing protocol. For example, a common routing protocol which is used by routing devices includes the Border Gateway Protocol (BGP). In connectionless packet forwarding protocols, like those in the Internet, network forwarding nodes make forwarding decisions based on local information indicating what a next "hop" should be for a packet based on the designation of the packet. Routers participate in routing protocols between one another to share information about the connectivity of the overall global network. The effect of the communication relating to these protocols includes each network forwarding node updating its local forwarding table with information learned from other nodes.

Figure 2:
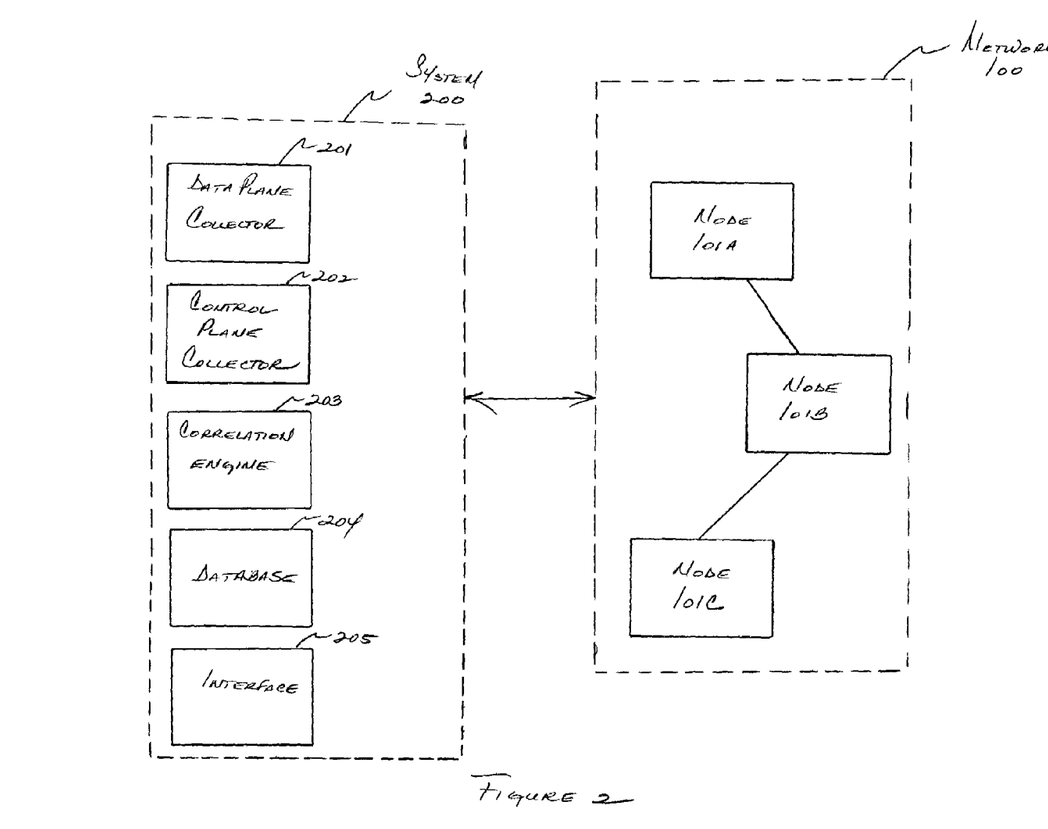
FIG. 2 is a block diagram of a network monitoring system according to one embodiment of the present invention.

FIG. 2 shows a block diagram of a network monitoring system 200 which is capable of correlating data plane and control plane information according to various aspects of the invention. In one embodiment, system 200 includes a data plane collector 201 which collects information about data forwarded by one or more network forwarding nodes. For instance, this data may indicate the amount of data forwarded by one or more network forwarding nodes during a given time interval (e.g., a one minute time interval or less). This data plane information may be allocated into records which corresponds to the same network, transport, and/or application layer endpoints in the network. Along with this information, it may be associated a timestamp which relates the collected information with a particular period of time. These records may then be further processed and stored in summary tables for use by a correlation engine 203 described in more detail below.

System 200 also includes a control plane collector 202 that collects and logs information from the control plane of a network forwarding node that may affect the data being forwarded by network forwarding nodes. Such control plane information may include reachability information such as availability, unavailability, changing characteristics/metrics of network, transport, or application endpoints. These records may also contain a timestamp that shows when the change in reachability information occurred along with specifics of the change.

System 200 also includes a correlation engine 203 that monitors data collected by the data plane collector 201 and control plane collector 202. When a control plane change is seen, or a change is seen in traffic transiting the data plane, correlation engine 203 generates an alert and presents the associated data for use by a network administrator. This monitoring capability allows the network administrator to determine what part of the network (e.g., network forwarding node) was responsible for the change in traffic so that an appropriate response can be formulated.

Data plane collector 201 and control plane collector 202 communicate with network forwarding nodes (e.g., nodes 101A-101C of network 100) to obtain information. Further, data plane collector 201 and control plane collector 202 may be capable of passively monitoring either control information or data forwarded by nodes 101A-101C. In summary, data plane collector 201 and control plane collector 202 may collect information in either a passive or inactive manner, and the invention is not limited to any particular method of collecting data.

Information collected by data plane collector 201 and control plane collector 202 may be stored in a database 204 associated with system 200. This database may be maintained, for example, by the same system that performs the data collection or a separate associated system or location. According to one aspect of the invention, data is stored in a relational database. According to another embodiment, data plane collector stores traffic information as flow summary records which describe the amount of data transferred within particular flow. Control plane collector 202 may store routing information that it receives from nodes 101A-101C. This control information may be, for example, state and topology information collected from routing or switching nodes. In particular, routing state changes and topology updates may be stored in database 204. In the case of BGP protocol, state changes may include information regarding the state of a BGP session, administrative or configuration changes, user-specified events, or the start and stop of the network forwarding system. Also in the case of BGP, database 204 may store BGP routing updates or state changes.

Database 204 may store several different types of information collected by the control plane collector 202. In one embodiment, database 204 stores a time-stamped, sequential archive of all routing changes (e.g., BGP updates). Database 204 may also store other event information including state changes, synchronization messages, and system-level events. In one embodiment, routing changes and event messages may be stored in database 204 in the order which they are received by the control plane collector 202. Also, database 204 may include a snapshot of the routing database received from any node 101A-101C and any particular point in time. In one embodiment, the snapshot includes a timestamp which indicates the time at which the snapshot was taken. Database 204 may also include, for example, statistical information that is determined based on the control information collected by control plane collector 202. This information may be, for example, inferred data which is calculated to, for example, indicate some feature of the control information. In particular, statistics may be generated based on the control information that indicates to and from where the data is sent in the network, (e.g., statistics that track changes in routes over time may indicate an instability in the routing table). The stored data of database 204 may be used in association with the data collected by data plane collector 201 to identify and determine the root cause of a network problem.

The control plane collector 201, data plane collector 202, and correlation engine 203 may, in one embodiment of the invention, reside on the same physical system and communicate information between each other using intra-system inter-process communication methods. However, it should be appreciated that system 200 may be a distributed system, with components being distributed throughout network 100. For instance, functions performed by data plane collector 201 may be distributed to one or more systems located in various parts of network 100. These distributed systems may be, for example, network communication systems such as routers, hosts having software processes capable of collecting data plane information (e.g., a network management system), or specialized collection systems that are adapted to collect data plane information. These distributed systems may include software processes that communicate information over network 100 using a network protocol (e.g., TCP/IP).

Network forwarding nodes 101A-101C (e.g., routers, switches) typically transmit information to collectors 201, 203 over a computer network. This network may be either in-band or out-of-band with respect to the computer network 100 being monitored. The monitoring system may present its own user interface to the network administrator, and/or may send alerts and other information to another network monitoring system (for example, using SNMP traps).

Figure 3:
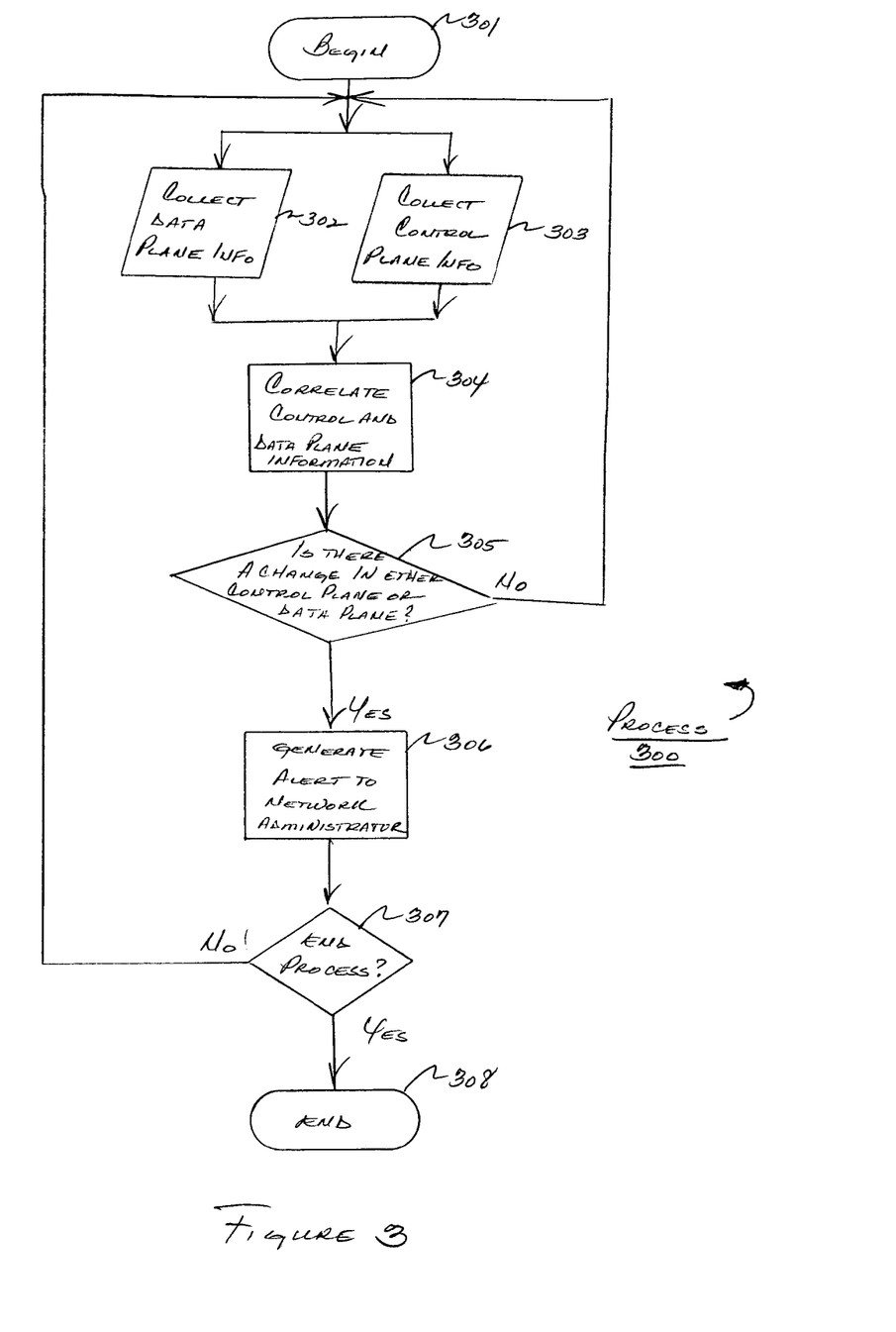
FIG. 3 is a flow chart showing a process for monitoring a network according to one embodiment of the invention.

FIG. 3 shows a flow chart of a process for monitoring a network according to one embodiment of the invention. In particular, monitoring process 300 may be implemented by, for example the system (e.g., system 200) to collect data and control plane information and correlate such information for the purpose of performing root cause analysis. At block 301, process 300 begins. At block 302, data plane information is collected from forwarding nodes. This information may be collected for example, by many different methods, including by requesting data via a network management protocol (e.g., SNMP), RMON, or any other method.

Control information may also be collected at block 303. Such information may be, for example, routing changes communicated between network nodes, system events, or any other control information that may impact how data is forwarded in the network. This information may be collected by many methods, including, but not limited to, by way of a network management protocol (e.g., SNMP), passively monitoring control information transmitted between nodes of the network, or actively participating in a network routing protocol (e.g., BGP).

Such collected information may be stored, for example in a database (e.g., database 204) associated with a monitoring system. Once collected, control and data plane information may be correlated at block 304. According to one aspect of the invention, it is realized that there is a relation between information related to data transmission and control information relating to the nodes that transmit the data. That is, it is realized that there is a caused relation between statistical data that describes the operation of the data plane with particular elements of the control plane, and if these associations are realized, the capability is provided for monitoring either the data plane or the control plane information and determining what impact changes in either have on the other.

In the case of determining the root cause analysis of a networking problem, data plane information may be observed, and if a change in the data plane behavior is observed, control information may be inspected to determine if there are any changes which may be responsible for the data plane information change. For instance, if traffic seen by a network forwarding node drops significantly, control information relating to that particular network node and its related network nodes can be inspected to determine what the potential cause of the data forwarding behavior can be attributed. For example, a drop in traffic may be due to a routing change in the network forwarding node or another node within the network which is attributable to traffic forwarded to that network node. Control information may be inspected more closely for control events that occur near the observed data forwarding change. In this manner, correlations from data to control plane information may be inferred based on the information's occurrence in time.

At block 305, it is determined whether there is a change in control plane or data plane information. This may be accomplished, for example, by observing the data plane or control plane information over time and noting statistical variations between the data collected. In the case of collecting data forwarding information, some provisions may be made for ignoring minor changes in data forwarding based on regular variances in network behavior (e.g., periodic downloads of large files, increased network behavior based on the time of day, etc.). Changes in control plane information may include, for example, routing changes, system events or other events that may have an impact on data forwarding.

If there is no change in either the control plane or the data plane, process 300 continues to collect data and control plane information. If there is a change however, an alert may be generated in a log, or sent to a network administrator at block 306. This may be accomplished, for example, by any manner of generating alerts including, for example, sending a log to a system log (e.g., a Unix syslog), generating events in a network management protocol (e.g., SNMP) traps sent to a network management station (NMS), or any other method. At block 307, it is determined whether or not the monitoring process is ended. A halt in process 300 may be performed, for example, by a network administrator that ends the monitoring application. If not, the monitoring process continues collecting data plane and control plane information and determining whether to generate alerts based on the collected information. If the monitoring process is halted, process 300 ends at block 308.

Figure 4:
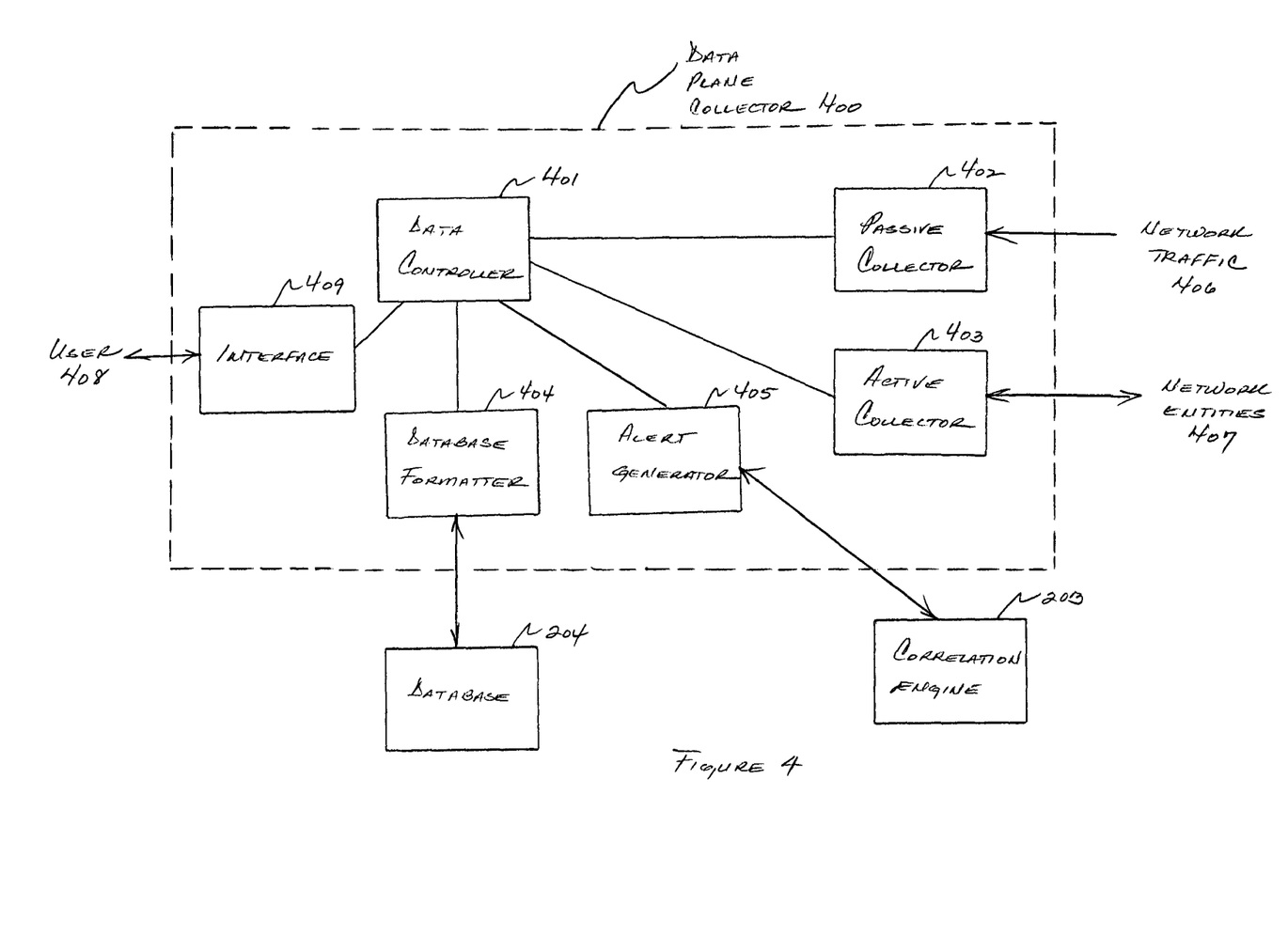
FIG. 4 is a block diagram of a data plane collector according to one embodiment of the present invention.

FIG. 4 shows a data plane collector 400 according to one embodiment of the invention. More particularly, data plane collector 400 may be similar in function to data plane collector 201 and may include a number of components. In this embodiment, collector 400 includes a data controller 401 which manages the collection and storing of data plane information. Data controller 401 may be, for example, a process that executes in a general purpose computer that executes an operating system capable of executing programs (e.g., a computer executing a Unix-based operating system). Collector 400 also includes passive collector 402 that passively observes network traffic 406, and generates data plane information which can be processed and saved by data controller 401. Similarly, collector 400 includes an active collector 403 that may actively communicate with other network entities 407 to determine data plane information. For example, an active collector 403 may include a system that communicates with a router to obtain data forwarding statistics. In one embodiment of the invention, these statistics may be in the form of flow records that are either generated by observing packets on the network (e.g., by passive collector 402) or by obtaining flow records from a network forwarding system (e.g., by active collector 403 obtaining flow records from a router).

Collectors 402 and 403 may provide data plane information to data controller 401 which can then save the data in database 204, present the information to a user 408 through an interface 409, or perform other functions with the collected data plane information. Collector 400 may also have the capability of generating alerts based on the collected information by alert generator 405. Alert generator 405 may be capable of generating alerts to be forwarded to other systems including, but not limited to, correlation engine 203. Collector 400 may also include a database formatter 404 which is capable of formatting and storing data plane information in the database 204. Formatter 404 may have the capability of consolidating data or reformatting data in a common format which can be stored in and accessed from database 204.

In one embodiment of the invention, data plane information is in the form of NetFlow records which is a part of Cisco IOS software executing in switches and router devices available from the Cisco Corporation. In particular, Cisco IOS NetFlow technology is a part of router or switch operating software that allows the router or switch to collect and measure data as it enters specific interfaces of the router or switch device. Generally, NetFlow technology allows the router to measure the amount of traffic crossing an interface for the purpose of performing traffic analysis, billing, or service-level management functions. Although NetFlow is one method for collecting traffic information, any other method for collecting data plane information may be used. For example, RMON or SNMP may be used to collect data plane information to one or more agents distributed in a network (e.g., network 100).

According to one embodiment, data plane collector 400 may be a distributed system which includes one or more collectors (e.g., collectors 402, 403) which perform data collection, filtering, aggregation, and storage and a network data analyzer (e.g., including controller 401, interface 409, database formatter 404, and alert generator 405) that performs a number of functions with the data plane information. For instance, data analyzer may perform a number of applications including network planning, accounting/billing, service-level management functions, or any other function that can use and analyze data plane information. Typical information collected by collectors 402, 403 include     source and destination IP address
    source and destination TCP/user datagram protocol (UDP) ports
    type of service (ToS)
    packet and byte counts
    start and end timestamps
    input and output interface numbers
    TCP flags and encapsulated protocol (TCP/UDP)
    routing information (next-hop address, source autonomous system (AS) number, destination AS number, source prefix mask, destination prefix mask)

Figure 5:
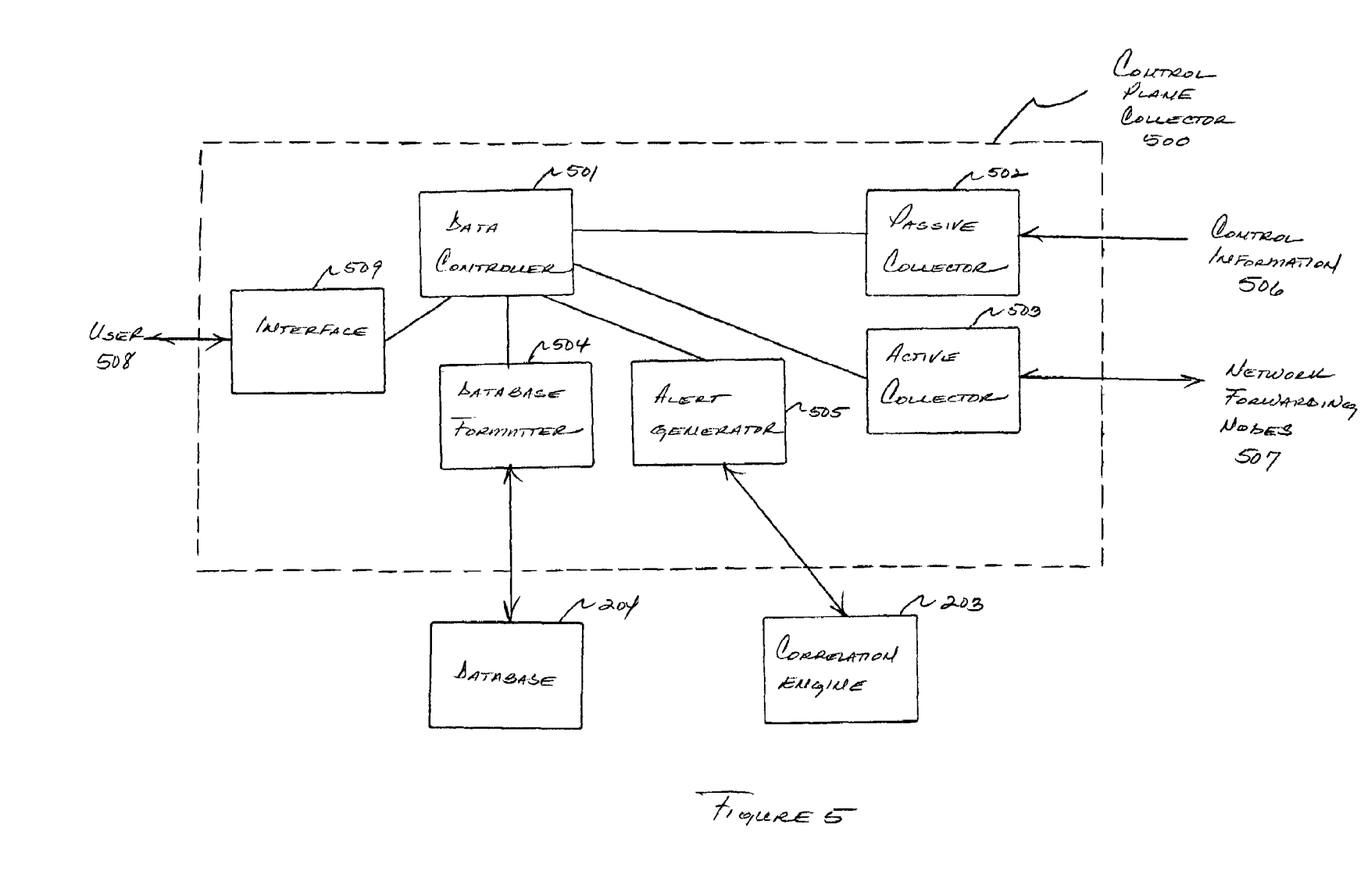
FIG. 5 is a block diagram of a control plane collector according to one embodiment of the present invention.

FIG. 5 shows a control plane collector 500 according to one embodiment of the invention. In particular, collector 500 may be similar in function to collector 202, and may include a number of components. Collector 500 may include a data controller 501 that receives control information and is capable of processing, displaying, and storing the control information. In one embodiment, data controller 501 is capable of displaying control information to a user 508 through an interface 509. Interface 509 may be, for example, an interface generated on a display of a general purpose computer. This interface may be, for example, a web interface, or other interface type as is known in the art.

Collector 500 includes a passive collector 502 which passively receives control information 506. In one embodiment, collector 502 passively observes control information transmitted between network forwarding nodes. Such information may include, for example, routing protocol information such as, for example, Border Gateway Protocol (BGP) messages transmitted between BGP routers. Collector 502 may, for example, passively monitor BGP updates and state changes observed from transmitted information.

Active collector 503 may obtain control information from network forwarding nodes 507 (e.g., routers and switches). Collector 503 may actively determine state information from a network forwarding node by, for example, a network management protocol, or participating in a network routing protocol. In one aspect, collector 503 implements a BGP routing protocol stack implementation, and maintains a BGP peering session with one or more BGP routers. Collector 503 receives BGP updates from the routers over its peering sessions and transfers them to data controller 501 where they can be stored or displayed to a user. In one embodiment, collector 503 supports eBGP and iBGP peering sessions, multiple peers, and common peering session configurations, including a specification of local IP address and local BGP AS number on a per-peering-session basis.

Collector 500 may also be capable of generating one or more alerts based on the control information collected. In particular, collector includes an alert generator 505 which is capable of receiving control information and generating events to one or more systems, including but not limited to, correlation engine 203.

Collector 500 also includes a database format 504 which is capable of storing information in database 204. For instance, routing state changes and topology updates may be stored along with a timestamp indicating when the update or change was received. State information that may be collected and stored includes the following BGP state information:

peering session up
    peering session down
    peering session errors
    administrative/configuration changes
    user-specified events
    system start
    system stop Collector 500 may also calculate statistical information relating to the control information it receives. In particular, collector 500 may calculate statistical information regarding routing information it receives on BGP peering sessions that it conducts with BGP routers. This statistical information may also be stored by data controller 501 in database 204. Collector 500 may also determine both explicit statistics and implicit statistics based on the received control information. For example, explicit statistics may be calculated directly from the BGP routing table and BGP updates received. Implicit information determined by collector 500 may include several types of BGP routing table changes that are identified based on the current routing table state when a BGP update is received.

Each of these statistics may be tracked separately on a network-wide, per-router, and per-inferred-peer basis. Standard statistical measures (e.g., sum, mean, median, standard deviation, local minima/maxima) may be calculated for one or more information elements over a period of time. For instance, statistics may be calculated over five minute periods, and each five-minute sample may be stored along with the time it represents in database 204 for later retrieval and analysis.

Explicit information that the collector 500 may collect includes:
- number of routes (average)
- number of unique AS Paths (average)
- number of BGP updates (sum)
- number of BGP announcements (sum)
- number of BGP withdrawals (sum)
- number of times each BGP peering session goes down (sum)
- number of times each BGP peering session comes up (sum)
- number of unique ASes in the routing table (average)
- number of unique origin ASes in the routing table (average)
- number of BGP communities (average)
- System start and stop Implicit information may also be summed over a period of time (e.g., five minutes), and may include:
- number of AADup
- number of WWDup
- number of AADiff
- number of TDown
- number of TUp
- probability of ASPath adjacencies
- probability of path selection
- probability of origin AS prefix origination
- probability of peer router prefix origination
- probability of path stability These implicit events are well-defined in BGP routing research literature. Briefly, they are:

AADup Duplicate Announcement—An announcement for a route identical to one that already exists in the routing table; the announcement must be identical in all attributes to the existing route, otherwise it is an AADiff.

WWDup Duplicate Withdrawal—A withdrawal for a route that has already been withdrawn from the routing table.

AADiff Implicit Change—A route is announced for a prefix which already has an existing route. However, the new route is different in one or more attributes than the existing route.

TUp Transition UP—a route comes up (is added to the routing table).

This does not include attribute changes to an existing route.

TDown Transition Down—a route goes down (is removed from the routing table)

In one embodiment, collector 500 maintains what is referred to hereinafter as a routing database, which includes information collected by collector 500. This routing database may be part of database 204, for example, and may be stored separately or part of other information (data plane information) stored in database 204. Collector 500 indexes data from the routing database, and retrieves the data efficiently in response to queries. The routing database may also include statistical information about the observed routing topology and state changes. This statistical information may be generated, for example, by data controller 501.

The routing database stores three important types of information generated by collectors 502, 503. In one embodiment, the database includes a change store, which stores a time stamped, sequential archive of all BGP updates. Updates are tagged with indices to simplify later queries, including the timestamp of the update and the source of the information. The change store also includes other event information including BGP state changes, synchronization messages, and system-level events. Synchronization messages are internally generated, time-stamped messages that uniquely identify a snapshot (described below) corresponding to that position in the sequential archive of changes. Updates and messages in the change store may be stored in the order in which they were received by collectors 502, 503.

Snapshots may also be stored in the routing database. A snapshot is a dump of the global routing table state at a given moment in time. A timestamp may also be stored with each snapshot indicating the time at which the snapshot was taken.

As discussed above, the routing database stores the routing topology, state change and statistical information calculated by the data controller 501. By using these three types of information, the system can quickly and efficiently reconstruct the routing table state at arbitrary times in the past. By querying the statistical information, the system can also show the history of instability in the routing table state over time, and can be used to identify (or at least narrow the potential set of) the causes of that instability.

In one embodiment of the invention, the routing database stores routing information in an efficient manner. The example storage scheme described in more detail below allows for fast and easy searches and quick and efficient pruning of old or unwanted data. Records may be time stamped to within one second granularity, and may be stored in sequential order based on the timestamp.

Collector 500 may store routing changes in a change store database. In one embodiment, the change store is implemented as multiple flat binary files. Each file contains 15 minutes' worth of change records, and each 15 minute period is aligned on quarter-hour boundaries based on the time of the system. For example, one file might contain data starting for the time interval 16:00:00 Sep. 12, 2001 through 16:14:59 Sep. 12, 2001. The next file in time order would run from 16:15:00 Sep. 12, 2001 through 16:29:59 Sep. 12, 2001, and so on. Each file is named based on the start time of the fifteen minute period it covers, which means that no separate database index system is needed in order to find a given record. To find the change events that occurred at a particular time, the system simply opens the file named with the start time of the fifteen minute period of interest.

Collector 500 may also store a routing table snapshot in a snapshot store database. The snapshot store may be stored similarly to the change store described above. A complete global routing table snapshot may be stored in a single flat file. In one example, one snapshot is taken every four hours, on the hour, and the file is named with the time of the snapshot. It is therefore possible to establish exactly where in the sequential change store a given snapshot falls, based on the timestamps of the snapshot and the change records.

Collector 500 may also maintain a statistics store database. In one embodiment, the statistics store stores data slightly differently than the other two stores, because it stores a large number of samples for a set of interesting statistics categories. As mentioned above, statistics information may be aggregated (either by summing or averaging) information into a single number representing a period of time (e.g., a five-minute sample) for that statistic, which is then stored in the routing database as follows.

Statistics may be stored in a set of flat files, each file containing all of the samples from a given time period. Each file may include a set of records, one for each type of statistic stored. Each record contains a numerical ID, corresponding to a well-known constant representing one of the types of statistics, a set of sample values for that file's time period for that statistic, and for efficiency, a separate entry for the maximum observed sample value for that time period. In one embodiment, because all of the records in a file contain the same number of samples, all records are the same size. Each file may also contain a header, which contains the start and stop timestamp of the samples contained in the file. Each file may be named by the timestamp of the time period its samples cover.

Because each record in a file is of fixed length, it is possible to deterministically read the samples for any data type for any time period simply by opening the file covering that time period and calculating the offset in the file where the record is located. Because each record in a file is the same size, this calculation can be easily performed by multiplying the numerical id of the statistic type to be read by the size of each record in the file. This allows lookup of the sample for a given time for any type of statistical information kept in the database, as well as for the maximum value observed over the given time period for each statistic.

To reduce the disk storage requirement of the routing database, the routing database may be pruned to remove old and unwanted information. Periodically, all data older than a configurable time interval may be deleted (e.g., data older than six months). The system prunes data from the routing database by first selectively removing state table dump files beyond a certain timeframe. Because only one complete state table file (or system/peer start) is necessary for state synchronization, this type of pruning allows a trade off of data query speed (which is dominated by state synchronization time) with data storage requirements of the routing database.

In one embodiment of the database architecture, removing this data is as easy as deleting all files with names that correspond to times older than the configured time interval. The routing database may also be pruned if it runs out of storage space. In this case, the oldest files are deleted until there is sufficient storage space to store new data.

Due to the large amount of data that may be generated by collector 500, it may be necessary to compress data over time so that storage allocated to collector 500 is not filled. Such compression may be performed, for instance, using industry standard round robin database techniques. Specifically, collector 500 may aggregate older 5-minute samples into samples covering larger time periods. Depending on disk size, the routing database can keep a well-known (and configurable) number of days worth of unaggregated 5-minute samples. Each day's worth of samples may be stored in a separate file and named with the timestamp of the day that the particular file covers.

Samples older than the number of days to be retained are aggregated together and stored on a weekly basis. To aggregate, six (6) 5-minute samples, for example, may be averaged together to yield one week sample of 30-minutes. If desired, the ratio of day to week samples can be configured to trade off disk usage vs. sample granularity. A week's worth of 30-minute samples may be stored in a single file covering one week, which is again named based on the time period that it covers. Similar to the manner by which information may be stored, a configurable number of week time periods can be stored before the system aggregates the samples into the next time period, which in one example is monthly. In one embodiment, the maximum 5-minute value of the days covered by each week file is also kept for each record, allowing the system to later determine the peak value for each statistic.

Sample aggregation may continue in a similar fashion through two more aggregation levels. The next aggregation may be weekly to monthly. By default, eight (8) 30-minute week samples are averaged together to form a 4-hour month sample, and a month's worth of these samples may be stored in a file that is again named by the time period covered. As discussed above, the ratio of week to month samples may be configurable by the user, along with the number of months to be kept before aggregating further. Further, the maximum of the maximum 5-minute samples from the weeks covered may be preserved for each record.

Another aggregation level that can be used is a yearly aggregation, in which (by default) 12 month samples are averaged together to make one 2-day year sample, and a year's worth of samples is stored for each record in a file named after the time period covered. This aggregation level may be configurable as discussed above with respect to other aggregation levels, and other information is carried over as with previous aggregation levels.

As discussed above, collector 500 may provide the capability for a user to query its stored control information. Using a query facility, users can, for instance, perform data mining of the historical routing data, analyze how routing topology and state evolve over time, and view the routing topology and state for any arbitrary moment in time, including the current state. Users can also track network instability and interesting or anomalous BGP events. Queries can be performed by either a user, or by another component of the system (such as, for example, a statistical modeling engine) that uses the data to provide other services.

As discussed above, system 200 may be capable of checking control plane information and data plane information for consistency. In one embodiment of the system, the link state of the network is modeled and monitored. The topology of the network is determined by collecting routing information from network nodes and creating a database of the routing topology. Data plane information such as traffic statistics are collected and correlated to the network topology. For instance, flow information relating to a particular network flow between TCP/IP network sources and destinations may be correlated to the path over the TCP/IP routed network to determine the paths over which a particular flow may traverse. If there is an observed change in traffic, this change in traffic may be correlated to particular sections in the topology of the network (the paths traversed and their related nodes) that may relate to the data plane information. For instance, if traffic from one interface from a network router flowing to another network router drops by a significant amount, this change in traffic may be correlated to a change in the router topology that may have been experienced prior to the observed change in traffic.

Because control information is stored historically in a database, and the stored control information may be correlated to the performance of data forwarding functions in the network, it can be determined that one or more particular control changes produce the effect observed in the data forwarding function. For instance, in the example discussed above with respect to the change in data forwarded by a particular interface of a router, this data forwarding effect may be attributed, for example, to a change in the routing topology of a BGP routing network. More specifically, the change in traffic on the interface may be attributed to a change in paths stored in the BGP routing database of the effected router. For instance, the effected router may have received an advertisement that changed the interface to which traffic is routed. Alternatively, there may have been an administrative change to the affected router (e.g., entry or modification of a static route) that may have affected its data forwarding.

In many cases, data forwarding changes observed on a particular network node may be attributable to changes in another network node. For example, a traffic drop scene on an interface to one router may be attributable to control changes made at another node that may affect traffic transmitted on the path through the affected router. Because the topology of the network is known, a change in data forwarding performance may be traced through the network topology to its source. Specifically, similar data forwarding performance changes may be observed through a number of network nodes along the path, and this may be traced back to a source node. For example, flow changes seen at a downstream node may also be seen at upstream nodes, and, by tracing the path of the data towards the source, the cause of the change may be identified as the node at which has first observed the data forwarding change, and therefore, the root cause of the change may be attributable to a control change in that node or a directly-connected node along the path.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for correlating network information comprising:
   obtaining control information from at least one of a plurality of network resources, wherein the network resources are routers and the control information is routing information that is used by the routers to transmit data within a distributed computer network between the routers and other systems of the distributed computer network;
   storing, in a database, status information related to a change of the control information;
   obtaining data transmission information from the at least one of the plurality of network resources;
   determining that the control information and the data transmission information are related;
   correlating the control information and the data transmission information;
   determining that a change in control information is related to an observation of a change in data forwarding; and
   observing the change in data forwarding by observing a change, over time, in the data transmission information.

2. The method according to claim 1, wherein the control information has a causal effect on the data transmission information.

3. The method according to claim 1, wherein the data transmission information includes at least one of the group comprising:
   network characteristics;
   transport characteristics;
   application characteristics;
   reachability information; and
   unavailability information.

4. The method according to claim 1, wherein the control information includes at least one record having a timestamp indicating when the change occurred.

5. The method according to claim 4, wherein the at least one record includes information indicating the nature of the change.

6. The method according to claim 1, further comprising an act of indicating that the change is causally related to a change in data transmission information.

7. The method according to claim 1, further comprising an act of indicating that the change is causally related to the change in data transmission information.

8. The method according to claim 6, wherein the act of indicating further comprises an act of indicating, to a user, that the change is related.

9. The method according to claim 7, wherein the act of indicating further comprises an act of indicating, to a user, that the change is related.

10. The method according to claim 1, further comprising acts of:
    monitoring a data transmission of at least one source address; and
    determining at least one network route associated with the at least one source address, wherein the act of determining that the control information and data transmission information are related further comprises correlating data transmission relating to the monitored data transmission with the at least one network route.

11. The method according to claim 1, wherein the resource in a network communication device is configured to forward data to one or more entities of a communication network.

12. The method according to claim 1, wherein the control information includes routing information of a network forwarding node.

13. The method according to claim 1, wherein the change in data forwarding is produced by a change in control information of a network forwarding node.

14. The method according to claim 13, wherein the change in control information includes a change of forwarding control information stored in a memory of the network forwarding node.

15. The method according to claim 1, further comprising an act of modeling behavior of a network forwarding system that forwards data based on the control information.

16. The method according to claim 15, further comprising an act of determining that the obtained data transmission information is inconsistent with the modeled behavior of the network forwarding system.

17. The method according to claim 16, further comprising an act of correlating the change in the control information with a change in the obtained data transmission information.

18. The method according to claim 1, wherein the act of obtaining control information includes an act of passively monitoring at least one transmission of the control information.

19. The method according to claim 18, wherein the control information is transmitted over a network.

20. The method according to claim 1, wherein the act of obtaining data transmission information includes an act of monitoring data stored in a network forwarding system.

21. The method according to claim 15, further comprising an act of modeling a link state of the network forwarding system.

22. The method according to claim 21, further comprising an act of correlating the link state with a change in data transmission information.

23. The method according to claim 1, wherein the act of obtaining control information includes an act of requesting the control information from a network forwarding node.

24. A system comprising:
    a collector adapted to receive data transmission information;
    a collector adapted to receive control information used by routers, wherein the control information is routing information that is used by the routers to transmit data within a distributed computer network between the routers and other systems of the distributed computer network; and
    a correlator that correlates the received data transmission information and the received control information, wherein the correlator is adapted to store changes in control information periodically over a period of time and is adapted to determine that a change in control information is related to an observation of a change in data forwarding within the distributed computer network.

25. The system according to claim 24, wherein the correlator is adapted to store a change in control information.

26. The system according to claim 24, wherein the data transmission information includes at least one of the group comprising:
network characteristics;
transport characteristics;
application characteristics;
reachability information; and
unavailability information.

27. The system according to claim 24, wherein the collector adapted to receive the transmission information and the collector adapted to receive the control information are distributed in a communications network.

28. The system according to claim 24, further comprising a database adapted to store the received data transmission information and the received control information.

29. The system according to claim 24, wherein the collector adapted to receive the data transmission information is configured to receive the data transmission information from one or more network forwarding nodes.

* * * * *